United States Patent
Gros

[15] 3,683,510
[45] Aug. 15, 1972

[54] PLUMB BOB DEVICE

[72] Inventor: Wilfred T. Gros, Rte. 12, Box 565, Houston, Tex. 77040

[22] Filed: Oct. 29, 1970

[21] Appl. No.: 85,095

[52] U.S. Cl. ............................... 33/392, 33/399
[51] Int. Cl. ................................... G01c 15/10
[58] Field of Search ............ 33/207, 216, 217, 220

[56] References Cited

UNITED STATES PATENTS

| | | | |
|---|---|---|---|
| 1,952,745 | 3/1934 | Deasy | 33/216 |
| 2,814,505 | 12/1939 | Danley | 33/216 |
| 616,912 | 1/1899 | Garner | 33/216 |
| 2,113,993 | 4/1938 | McLaughlin | 33/216 |
| 2,571,287 | 10/1951 | Peters | 33/216 |
| 2,578,062 | 12/1951 | Greene | 33/216 |
| 3,521,369 | 7/1970 | Jones | 33/207 |

*Primary Examiner*—Leonard Forman
*Assistant Examiner*—Charles E. Phillips
*Attorney*—Jack W. Hayden

[57] ABSTRACT

A plumb bob device suspended on a flexible member in a liquid in a closed container. The container is provided with a centrally positioned, upwardly pointed indicator means for aligning with the plumb bob to indicate a true vertical relationship, and a flexible member is connected to the top end of the closed container for suspending it from a fixed position. A flexible member is connected to the lower end of the container and extends downwardly for connection to a weight or the like so as to tether the closed container to accommodate only very limited movement thereof so that the plumb bob may accomplish its function.

1 Claim, 2 Drawing Figures

Patented Aug. 15, 1972
3,683,510
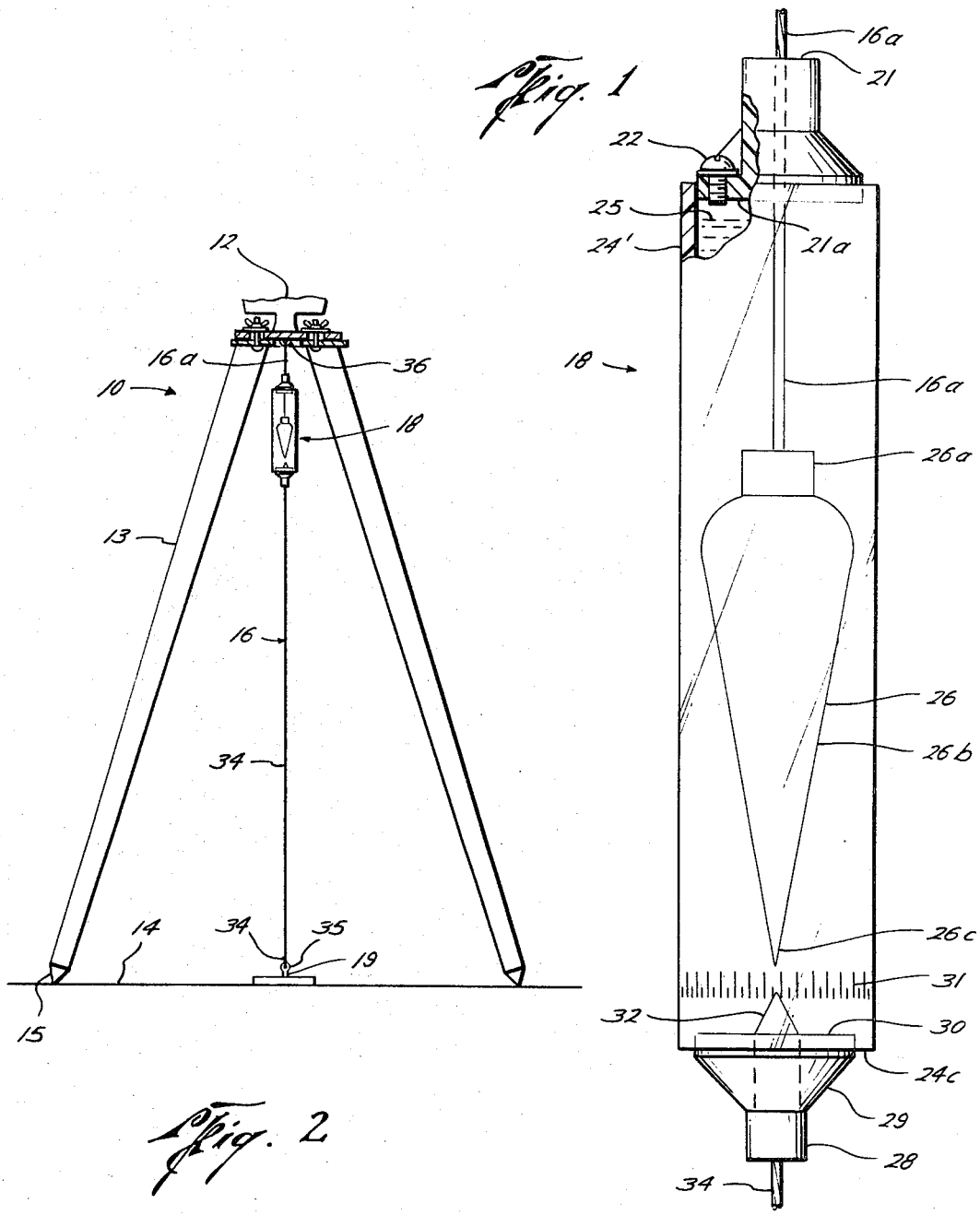
Wilfred T. Gros
INVENTOR
BY Jack W. Hayden
ATTORNEY 3,683,510

PLUMB BOB DEVICE

SUMMARY OF THE INVENTION

Plumb bob devices are utilized in obtaining verticals which are referenced to the center of gravity of the earth as a means of properly erecting buildings, structures, and the like. Of course, other uses are known for vertical lines. Plumb bob devices known in the prior art have entailed the use of a string or other flexible member on which is suspended a weight which has a downwardly directed point at the lower side. In attempting to obtain a vertical therewith, the device is suspended with the flexible member extended, whereupon the plumb bob device tends to oscillate for an extended period of time about the eventual vertical line. On conclusion of the oscillations, the vertical is indicated by the pointer carried on the lower portions of the weight. The line or location then determined is useful in indicating the vertical for the construction of buildings and for the performance of other tasks as will be appreciated.

Plumb bobs are also used to reference a point above a lower point. For instance, in surveying, a tripod may be erected above a stake; and the tripod is used by the surveyor to obtain desired measurements with reference to the stake. Obviously, the tripod cannot be positioned with the surveying instrument immediately above the stake since the usually low elevation of the stake interferes with operation of the tripod and surveying instrument. Thus, plumb bobs have been also used to properly vertically position a surveying instrument with reference to a stake or other point located therebelow wherein the gravity of the earth draws the plumb bob directly towards the stake and, as a consequence, assists in locating a point in vertical alignment thereabove. In any case, the uses and desirability of a straight line at a desired location are known to those skilled in the art.

With a view of the function of plumb bob devices and with a further understanding of the operation of a conventional plumb bob, it is therefore an object of the present invention to provide a new and improved plumb bob device utilizing a viscous dampening medium to eliminate the need for waiting out a period of oscillations in initially obtaining a vertical.

Another object of the present invention is to provide a new and improved plumb bob suspended in a transparent encasement with liquid as a dampening medium therein whereby obtaining a plumb line is materially speeded.

An additional object related to the above noted object is the provision of a dampened and encased plumb bob which obtains a vertical during weather conditions in which a conventional plumb bob might be difficult, if not impossible to use.

Other objects and advantages of the present invention will become more readily apparent after considering the following description and drawings wherein:

BRIEF DESCRIPTION OF THE DRAWINGS

FIG. 1 is a plan view of the device of the present invention including a portion thereof broken away for greater details thereof; and FIG. 2 is a view of a tripod utilizing the structure of the present invention for obtaining a vertical plumb line.

DESCRIPTION OF THE PREFERRED EMBODIMENT

Considering the invention broadly, attention is directed to FIG. 2 which illustrates a tripod 10 which is adapted to carry thereabove a surveying instrument which is partially indicated at 12 which may be, of course, any suitable device known in the art. The tripod 10 includes a plurality of legs which is embedded or placed in the earth 14 at 15. A string or other flexible member 16 is suspended from the center of the tripod structure 10, and the means 18 of the present invention is attached to the flexible member 16, as will be described in greater detail. While considering the invention as shown in the context of the tripod in FIG. 2, it will be noted that it is generally desired to obtain vertical alignment of the center of the tripod structure 10 with respect to a bench mark 19 or other marker whereby more rapid leveling of the tripod 10 is obtained and wherein operations can be pursued even during weather conditions which might otherwise customarily be restrictive of use of plumb bobs known in the prior art.

Considering the invention more in detail, attention is directed to FIG. 1 which illustrates a portion of the flexible member 16a which passes through a collar means 21. The string 16a is passed through and embedded in the mounting collar 21 which is a solid member as best illustrated in the sectional view at the left-hand side of FIG. 1. The collar 21 extends downwardly, centrally of the device and includes a tap screw 22 which is received in a suitable opening therein. The lower portion of the collar 21 includes a circular portion 21a which is adapted to be contacted against a surrounding structure or container which is indicated by the numeral 24'. The wall of the structure or container 24' is preferably formed of a transparent material and may be, by way of example and not limitation, a material such as plexiglass or the like. The structure 24' is preferably tubular and is sealingly joined to the collar 21 at its upper periphery by means of glue or the like.

The tap screw 22 provides easily opened and closed access to the interior of the structure 24' for adding or deleting viscous dampening liquid. The liquid is added to the interior of the 45, structure 24' sufficiently to fill the interior thereof to the level approximately indicated by the dotted line at 25. The flexible member 16a extends therethrough collar 21 and at some suitable intermediate portion of the container 24' the flexible member 16a is connected to the upper end of a plumb bob member 26. Plumb bob member 26 is a typical weighted member of any suitable construction which includes an upper collar 26a, a larger upper portion 26b which tapers into a lower, pointed tip 26c. A closed chamber is defined by the container 24', collar 21, and collar 28 so as to encase or surround the plumb bob member 26. The collars 21 and 28 may be bonded or secured to the structure 24' by any suitable means.

The lower portion of the container 24' includes a lower collar 28 which is flared at 29 to provide structure for joining with the lower periphery 24c of the structure or container 24'. The line indicated at 30 preferably represents the upward extent of the collar means 28, and it will be appreciated that the collar means 21 and 28 seal with the encircling cylindrical structure 24' to provide a leakproof arrangement with the dampening liquid 25 received therein. The extent and diameter of container 24' is such that it will accommodate swinging movement of the plumb bob member 26. While the flexible string 16a is shown as extending through collar 21, it could be connected to the upper end thereof and a separate flexible string connected to collar 21 for suspending plumb bob member 26 in container 24'.

An upwardly extending pointer means 32 is provided centrally of the lower end of container 24' and is included to provide a comparison which can be matched with the downwardly hanging point 26c on the plumb bob member 26. Thus, it will be appreciated that alignment of the two points which are spaced apart from each other serves as an indication to the user of the present invention that a vertical line has been obtained by the present invention.

The lower collar 28 includes means for receiving therein and fixedly connecting therewith a flexible member indicated at 34. The flexible member 34 is extended below the plumb bob device 18 of the present invention and is connected with the bench mark 19. Of course, it will be appreciated that the relative lengths of the connecting line 34 and the vertical line 16a thereabove are subject to variation, and it will be further appreciated that the selection of the lengths above and below the plumb bob device 18 of the present invention is within the choice of the user. The portion 34 of the flexible string tethers the container 24'. That is, it accommodates some movement of container 24' within limits.

While the foregoing has given some of the details of fabrication and construction of the present invention, it is preferable to describe the use of the present invention to aid in enlightening those skilled in the art. The flexible member 16a is attached at one end to a fixed surface or to a transit. The plumb bob member 26 is suspended in the liquid 25 within the closed chamber formed by container 24', by collars 21, 28, on a flexible string as at 16a. Another flexible string 34 is secured to the collar 28 in the other end of container 24' to accommodate limited motion thereof, thus providing, by way of example, an arrangement similar to that of FIG. 2. The example of FIG. 2 shows the flexible line 34 secured at its lower end relative to the bench mark and the line 16a is pulled somewhat taut so as to position the means 18 in a desired relationship relative to the attaching means at the opposite ends of the portions of the flexible strings 16a and 34. When used as shown in FIG. 2, the flexible string 34 may be attached to a ring eyelet 35 and the flexible member 16a is connected to an eyelet 36 on the nether side of the structure of the transit 10. When attempting to place the transit 10 in position above the bench mark 19, the lines 16a and 34 are pulled relatively taut and the transit is placed in approximate vertical position above the bench mark. Since the eyelet 36 is customarily located at the center of the transit, it will be appreciated that the flexible member 16 provides a true projection of the center of the transit when vertical alignment is obtained. The apparatus is moved to the above noted approximate position, and a sighting of the plumb bob in the transparent structure 24' is made. If the plumb bob device 18 of the present invention positions the pointed tip 26c of the weighted member opposite the point 32, then it may be concluded that a vertical line has been obtained by operation of the present invention. However, if the point 26c is displaced to one side of the point 32, then the line described in the preliminary setup of the apparatus 10 is not vertical. Thus, if the displaced plumb bob 26 is deflected to the left as viewed in FIG. 1, it is then apparent that the eyelet 36 on the transit 10 is left of the bench mark 19.

The transit structure is moved to the right and is checked by taking another sighting of the plumb bob device 18 of the present invention. When moved to the right, it will be appreciated that movement proportional to the degree of the deflection of the point 26c from the point 32 will result in alignment of the tripod to obtain a true vertical. Of course, the above noted example of displacement of the plumb bob mass 26 to the left of the point 32 is representative in one dimension of what actually occurs in two dimensions; and it will, therefore, be appreciated that the possibility of rectilinear resolution of the displacement of the point 26c with respect to the point 32 may be necessary to achieve alignment. However, in all events, it will be appreciated that such movements are relatively straightforward with the aid of the calibrations 31 provided about the lower portion of the encircling cylindrical structure 24.

The device of the present invention is adapted to be used during weather conditions when conventional plumb bob devices are unavailing. For instance, during a windy day, the flexible string 16a usually used with conventional plumb bob devices is sufficiently long to catch wind and to cause continual fluctuation of the plumb bob. But, the structure of the present invention is adaptable to be used during weather conditions ordinarily forbidding the use of a transit. The device of the present invention is essentially immune to windy conditions because the plumb bob device 18 is tethered by the flexible members 16a and 34 in a manner so that the wind is ineffectual. The plumb bob device 18 is not permitted to move as a result of the wind force acting on its side and acting on the flexible members. However, it will be appreciated that tethering of the device as above noted does not interfere with the operation of the plumb bob device of the present invention, and the device is still available to obtain the desired vertical. Thus, the absence or presence of the blowing wind is of no consequence to the plumb bob mass 26 suspended in the viscous dampening fluid, for the surrounding structure prevents the wind from having any effect on the plumb bob mass 26.

In conclusion, it should be noted that vertical alignment is materially accelerated because the number of oscillations entailed in achieving a final position of the plumb bob mass 26 is reduced to almost zero, and the oscillations are made completely independent of the weather.

The present invention provides a structure which is adapted to be used in sight lines, surveying instruments, building construction, and the like. To avoid overextending the examples of operation of the present invention, the foregoing should be sufficient to instruct one skilled in the art in the operation of the present invention and to enable the user to obtain the new results provided herein.

The foregoing disclosure and description of the invention are illustrative and explanatory thereof, and various changes in the size, shape, and materials as well as in the details of the illustrated construction may be made without departing from the spirit of the invention.

What is claimed is:

1. An alignment device comprising:
   a. a plumb bob member;
   b. a transparent, closed container surrounding said plumb bob member;
   c. flexible means for suspending said plumb bob member from one end of said container to hang within said container;
   d. a dampening liquid in said container in which said plumb bob is immersed for dampening movement thereof;
   e. upwardly pointed indicator means centrally positioned within said closed container at the other end thereof for alignment with said plumb bob to indicate a true vertical relationship of said plumb bob member;
   f. flexible means secured to said container at said one end for suspending said container from a fixed position; and
   g. flexible means secured to said other end of said container for securing said container in tethered position to inhibit movement thereof in a wind.

* * * * *

PO-1050
(5/69)

UNITED STATES PATENT OFFICE
CERTIFICATE OF CORRECTION

Patent No. 3,683,510                    Dated  August 15, 1972

Inventor(s)    Wilfred T. GROS

It is certified that error appears in the above-identified patent and that said Letters Patent are hereby corrected as shown below:

Line 46, column 2, cancel "45," after "of the".

Line 49, column 2, change "therethrough" to --through--.

Line 50, column 2, after "of the" insert --structure or--.

Line 56, column 2, before "container" insert --structure or--.

Line 61, column 2, before "container" insert --structure or--.

Line 67, column 2, cancel "encircling".

Line 2, column 3, before "container" insert --structure or--.

Line 7, column 3, insert --structure or-- before "container".

Line 40, column 3, change "24', by" to --24' and--.

Signed and sealed this 30th day of January 1973.

(SEAL)
Attest:

EDWARD M. FLETCHER, JR.                ROBERT GOTTSCHALK
Attesting Officer                      Commissioner of Patents